(12) United States Patent
Savant et al.

(10) Patent No.: US 10,650,171 B1
(45) Date of Patent: May 12, 2020

(54) MECHANISM SYNTHESIS APPROACH TO SOLVING DESIGN PROBLEMS WITH POSITION BASED CONSTRAINTS

(71) Applicant: Dassault Systemes SolidWorks Corporation, Waltham, MA (US)

(72) Inventors: Shrikant Vitthal Savant, Shrewsbury, MA (US); Kyeong Hwi Lee, Lexington, MA (US)

(73) Assignee: DASSAULT SYSTEMES SOLIDWORKS CORPORATION, Waltham, MA (US)

( * ) Notice: Subject to any disclaimer, the term of this patent is extended or adjusted under 35 U.S.C. 154(b) by 763 days.

(21) Appl. No.: 14/757,697

(22) Filed: Dec. 22, 2015

Related U.S. Application Data

(60) Provisional application No. 62/096,279, filed on Dec. 23, 2014.

(51) Int. Cl.
*G06F 30/00* (2020.01)
(52) U.S. Cl.
CPC .................................... *G06F 30/00* (2020.01)
(58) Field of Classification Search
None
See application file for complete search history.

(56) References Cited

U.S. PATENT DOCUMENTS

| | | | | |
|---|---|---|---|---|
| 5,835,693 A | * | 11/1998 | Lynch | B25J 9/1605 345/473 |
| 6,366,293 B1 | * | 4/2002 | Hamilton | B25J 9/1671 345/420 |
| 6,385,563 B1 | * | 5/2002 | Vora | G06T 19/00 703/6 |
| 6,738,065 B1 | * | 5/2004 | Even-Zohar | G06Q 30/06 345/473 |
| 2015/0005941 A1 | * | 1/2015 | Milenkovic | B25J 9/163 700/262 |

* cited by examiner

*Primary Examiner* — Bijan Mapar
(74) *Attorney, Agent, or Firm* — Hamilton, Brook, Smith & Reynolds, P.C.

(57) ABSTRACT

A computer-implemented method and system automatically solves constraints in a computer-aided design (CAD) model. A CAD model of a real-world object capable of assuming various positions is constructed and a constraint solver process is initiated and executes while a user defines multiple positions of the CAD model. Input of data specified during a CAD design workflow is automatically input to the constraint solver process, and unknown variables are solved for as part of the CAD design workflow.

20 Claims, 4 Drawing Sheets

MECHANISM SYNTHESIS APPROACH TO SOLVING DESIGN PROBLEMS WITH POSITION BASED CONSTRAINTS

RELATED APPLICATION(S)

This application claims the benefit of U.S. Provisional Application No. 62/096,279, filed on Dec. 23, 2014. The entire teachings of the above application(s) are incorporated herein by reference.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to respective topological faces bounded by edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly or an assembly. A subassembly may also consist of other subassemblies. An assembly is designed using parts and subassemblies. Parts and subassemblies are hereinafter collectively referred to as components.

During the design process, an engineer may simulate the design of a model to analyze and evaluate the real-world performance of the product being designed. Such a simulation may be executed by an engineering simulation process, examples of which are SolidWorks® Motion, SolidWorks® Simulation Xpress, and SolidWorks® Simulation, which use the CAD model data to set up and execute motion or, simulation studies and are available from Dassault Systemes SolidWorks Corporation of Waltham, Mass. A motion simulation may be performed in a two-dimensional (2D) or a three-dimensional modeling environment.

Solving for the proper motion of a CAD assembly model is difficult. Predetermined starting and ending positions may exist. In addition, a number of other positions may be defined and required by the design intent or by the interaction of different parts in the assembly. Solving for the proper motion when various positions of an assembly are required becomes exceedingly difficult. Currently, a user may iteratively modify a sketch of a part in an assembly in an attempt to specify predefined start and end positions. The system may not, however, have the ability to precisely solve for the exact start and end positions. Additionally, only a single view of the sketch is available for the start position and the end position, as well as intermediate positions of the assembly in motion.

While designing a mechanism, usually there are many design parameters and one or a few design targets. Examples of such design parameters are lengths and dimensions. Examples of design targets can be specific target positions, constraint values at various design positions, forces, torques, vibration responses, and tracking errors.

The design parameters are chosen in such a way as to meet certain design requirements, for example, satisfying various constraints for different positions of the mechanism. The values of the design parameters cannot usually be solved in any obvious and simple way. Having different constraints active in different positions of the mechanism makes this problem even more difficult to solve because the user cannot easily determine if all the constraints are satisfied at the same time.

The values selected for the design parameters usually affect the one or more design targets in a very complex fashion. A user generally has difficulty selecting the right combination of these design parameters so that the one or more design targets are achieved satisfactorily. As a result, the approach taken by the user is iterative. The user selects a set of values for these design parameters based on past experience or engineering judgment. The design targets are evaluated for that choice of design parameters. If the design targets are achieved satisfactorily, the process stops otherwise a new design iteration begins with a different set of design parameter values and the process continues until the design targets are met.

This approach is iterative, slow, and computationally expensive. A method and system that computes the values of the design parameters during the design workflow so that the design targets are met with a minimal amount of design iterations would be valuable functionality for a computer-aided design and motion simulation system.

SUMMARY OF THE INVENTION

In general, in one aspect, embodiments of the present invention feature a computer-implemented method for satisfying the design constraints in a computer-aided design (CAD) model in numerous design positions simultaneously. Unknown variables are solved in real-time during a user's design workflow. The CAD model represents a real-world object that may assume a number of different positions. A constraint solver process is initiated and executes while base and additional positions are being defined. As the positions are being defined, the positions, dimensions, constraints are input to the constraint solver.

Embodiments include a CAD system having a processor operatively coupled to a data storage system and a data storage memory operatively coupled to the processor. In such embodiments, the data storage system stores a model, and the data storage memory comprises instructions to configure the processor to construct a CAD model of a real-world object, where the CAD model and the real-world object are capable of assuming various positions. A constraint solver process is initiated and executes while a user defines multiple positions of the CAD model. The instructions further configure the processor to automatically input to the constraint solver process a base position of the model, dimensions, and constraints as a user is defining the base position of the model, the dimensions, and constraints during a CAD design workflow; additionally, the processor is configured to automatically input to the constraint solver process one or more additional positions of the CAD model, respective dimensions for each additional position, and respective constraints for each additional position as the user defines the additional positions of the model, respective dimensions, and respective constraints during the CAD design workflow. As the constraint solver process receives the input, unknown variables are solved.

Other embodiments include a computer-readable medium configured to store instructions for causing a computer to construct a CAD model of a real-world object, where the CAD model and the real-world object are capable of assuming various positions. Further instructions cause the computer to initiate a constraint solver process that executes while a user defines multiple positions of the CAD model. The instructions also cause the computer to automatically input to the constraint solver process during the CAD design workflow (1) a base position of the model, dimensions, and constraints as a user is defining the base position of the model, the dimensions, and constraints, and (2) one or more additional positions of the CAD model, respective dimensions for each additional position, and respective constraints for each additional position as the user defines the additional positions of the model, respective dimensions, and respective constraints. As the constraint solver process receives the input, unknown variables are solved.

Additionally, embodiments include, for each additional position, applying respective constraints and respective dimensions specific to each additional position, and adding equality constraints between variable dimensions in at least one additional position and the base position. Embodiments also include tightly integrating the constraint solver process in the CAD design workflow as part of a design iteration loop. Moreover, during the workflow process, the dimensions and the constraints for each additional position are continuously solved, and the CAD model is updated on a computer screen to provide visual feedback of the previous design iteration. Geometry of the CAD model may be adjusted by the constraint solver process to solve for a unique position. Additionally, embodiments include redefining one of the additional positions, and the constraint solver solving for new or updated data generated as a result of redefining one of the additional positions.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

The present invention provides a solution for simultaneously satisfying all design constraints in all design positions of a computer-aided design (CAD) model that represents a real-world mechanism. One of the positions is a base design position, which acts as a master position of the CAD model design. In each design position, different constraints may be active. The constraints defined in the master position are applicable to all design positions, whereas the constraints defined in the other design positions are applicable only to that respective design position. The present invention utilizes a CAD constraint solver to solve the design problem of having a mechanism assume multiple positions.

Figure 1:
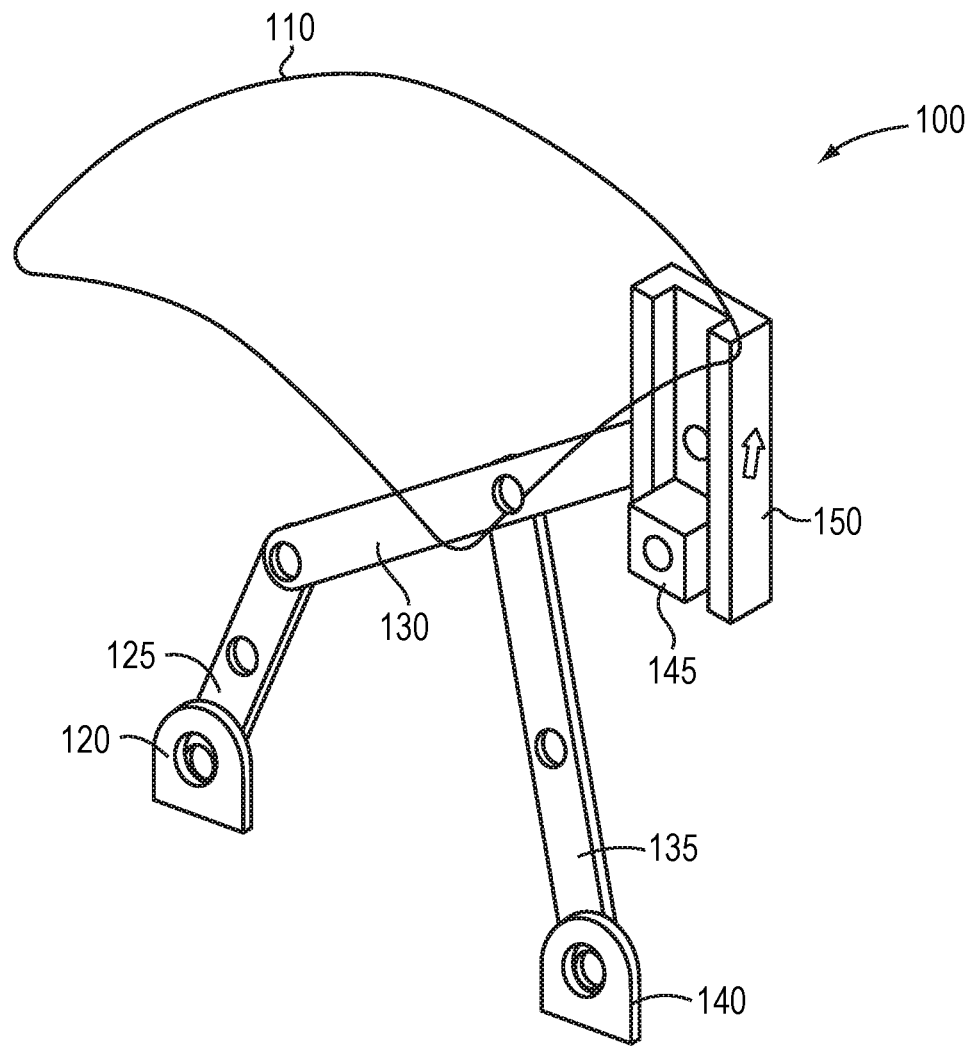
FIG. 1 is an illustration of a computer-aided design (CAD) model.

Referring now to FIG. 1, an illustration of a CAD model 100 is shown. The model 100 contains parts 120-150 that are constrained to at least one other part. Parts 120 and 140 are also constrained to the ground, which is beneath parts 120 and 140. A path 110 along which part 150 moves is also shown in FIG. 1.

Figure 2:
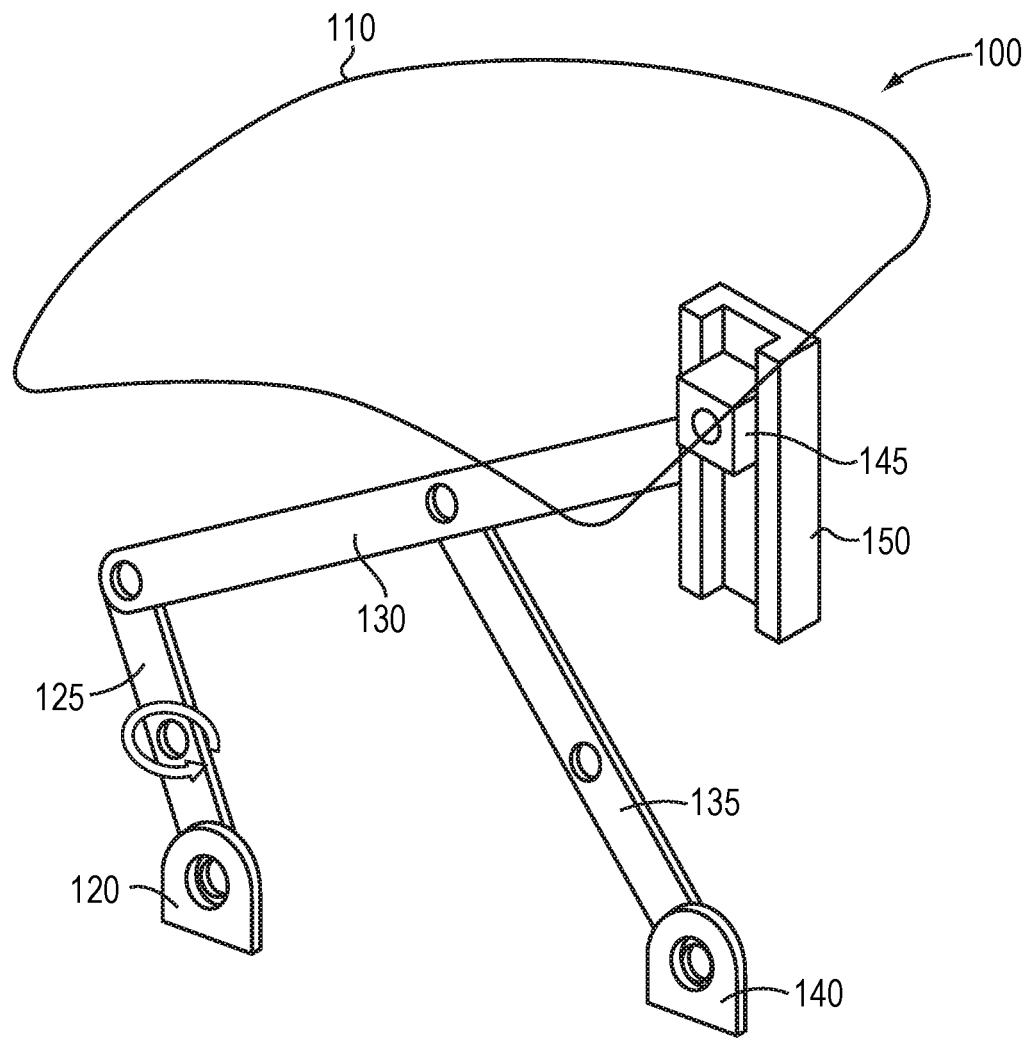
FIG. 2 is an illustration of the CAD model in FIG. 1 after motion to one or more parts has occurred.

FIG. 2 is an illustration of CAD model 100 after parts 120-150 have undergone motion in an embodiment of the present invention. As shown in FIG. 2, part 150 is at a different location on the path 110. Additionally, the orientations of parts 125 and 135 are at different angles with respect to part 130 than as shown in FIG. 1 due to motion of model 100. The orientations of parts 125 and 135 are also at different angles to parts 120 and 140, respectively, due to the motion of model 100. Path 110 may reflect a path output by a simulation process. Alternatively, path 110 may have been input by a user and the sizes of parts 120-150 may have been resized automatically by the present invention so that part 150 travels along the path prescribed by the user as model 100 undergoes a motion analysis process.

Figure 3:
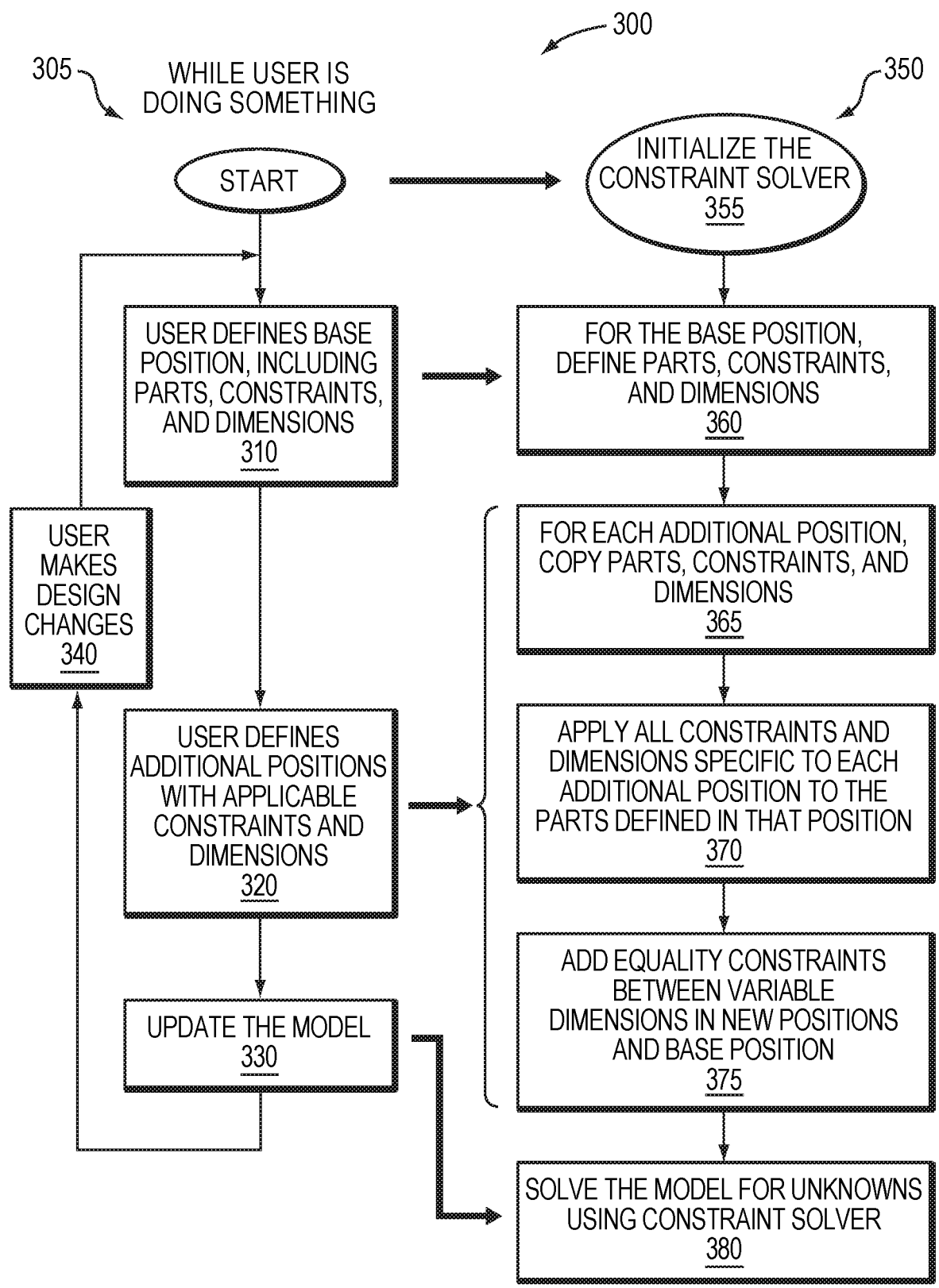
FIG. 3 is a flow diagram of a process that includes design iterations.

Referring now to FIG. 3, a flow diagram illustrates a design process 300 that integrates a user design workflow 305 and a constraint solver process 350. In an embodiment, when the user begins the analysis of the positioning of CAD components in a model, a constraint solver is launched (step 355). The constraint solver may execute as a background process in a computerized modeling system, which will be described with reference to FIG. 4. Further, the constraint solver may be commercially available or proprietary. An example of a commercially available constraint solver is 3D Dimensional Constraint Manager available from Siemens Product Lifecycle Management Software Inc. of Munich, Germany. The user then defines a mechanism in the base design position (step 310), which includes the part models that comprise the mechanism, the constraints between the parts, and the dimensions of different part features. This definition is automatically input to the constraint solver where the constraint solver creates an internal solver representation of parts, constraints, and dimensions for the base position (step 360). The user then defines additional positions the model may assume and for each such position, he or she defines any dimensions or constraints that are applicable to that position (step 320). The user may switch the view from the base position to any of the other design positions at any time simply by selecting the appropriate view. This way the user sees the mechanism in only one position at any time.

While the user is defining the additional positions (step 320), the constraint solver process 350 is automatically receiving data from the user workflow process 305 and performing operations using that data. This includes for each additional position, copying the parts, constraints, and dimensions (step 365), applying all constraints and dimensions specific to each additional position to the parts defined in that position (step 370), and adding equality constraints between variable dimensions in new positions and the base position (step 375).

In an embodiment, the user defines the base position and the additional positions in separate views. The user may switch the view from the base position to any of the other design positions any time simply by selecting the appropriate view. As the user is defining and possibly re-defining additional positions (step 320), the constraint solver process 350 processes the new and updated data (steps 365, 370, 375). For example, if the same part is used in two or more positions, appropriate equality constraints are created to ensure that the length of the same part in different positions is maintained.

During the user workflow process, the user may initiate a command to update the model (step 330), at which time, the constraint solver process 350 solves for the unknown variables in the CAD model (step 380). The user may make design changes (step 340) then once again redefine the base and/or additional positions (steps 310, 320) and initiate an update (step 330) while the constraint solver continuously processes the user workflow data and solves for the model variables (steps 365, 370, 375, 380).

The constraint solver may automatically adjust the geometry of a part model to solve for the unique positions. Additionally, one or more features may automatically be added to constrain features in different parts.

In an embodiment, dimensions and constraints that are defined in a particular view of the CAD model are assumed to be defined in the corresponding design position. Dimensions and constraints that are applicable to all positions are defined in the base position. Dimensions and constraints that are applicable to a particular position are defined only in that position.

The CAD model of the mechanism, including all the parts and the constraints, defined in the base position is copied once for each additional position defined by the user. Each part in the CAD model is tagged to indicate whether the part is to be displayed in one or more positions. When the user selects the position in which he or she wishes to view the CAD model of the mechanism, he or she is able to view only those parts that are active in that position.

Any known design parameters are defined by the user as "fixed dimensions," whereas any unknown design parameters are defined as "variable dimensions." When the CAD model is copied for each additional position, the fixed and variable dimensions are also copied. Internally, the present invention adds additional equality constraints, one for each variable dimension between the base position and one or more corresponding additional position, or a number of equality constraints for each variable dimension where each is between the base position and one of the corresponding additional positions. All the copied positions, dimensions, and constraints along with the internally added equality constraints are input to a constraint solver for solving as the user is working on the CAD model of the mechanism. The equality constraints ensure that a particular design parameter that the constraint solver solves for has the same value across all positions. Since the constraint solver is continuously solving for the unknown dimensions in all the positions at the same time, the user receives immediate feedback and the screen is continuously updated with the final solution of the design for the previous design iteration even as the user is making changes to the design.

Figure 4:
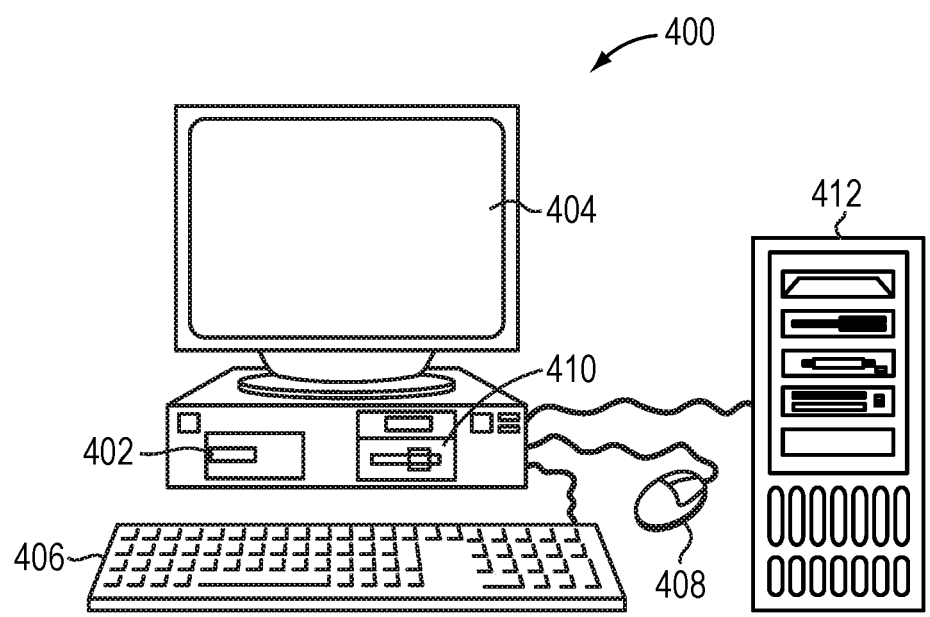
FIG. 4 is an illustration of a computer system in which embodiments of the present invention may be implemented.

FIG. 4 illustrates a computerized modeling system 400 that includes a CPU 402, a computer monitor 404, a keyboard input device 406, a mouse input device 408, and a storage device 410. The CPU 402, computer monitor 404, keyboard 406, mouse 408, and storage device 410 can include commonly available computer hardware devices. For example, the CPU 402 can include an Intel-based processor. The mouse 408 may have conventional left and right buttons that the design engineer may press to issue a command to a software program being executed by the CPU 402. As an alternative or in addition to the mouse 408, the computerized modeling system 400 can include a pointing device such as a trackball, touch-sensitive pad, or pointing device and buttons built into the keyboard 406. Those of ordinary skill in the art appreciate that the same results described herein with reference to a mouse device can be achieved using another available pointing device. Other appropriate computer hardware platforms are suitable as will become apparent from the discussion herein. Such computer hardware platforms are preferably capable of operating the Microsoft Windows® 7, UNIX, Linux, or MAC OS operating systems.

Additional computer processing units and hardware devices (e.g., rapid prototyping, video, and printer devices) may be included in the computerized modeling system 400. Furthermore, the computerized modeling system 400 may include network hardware and software thereby enabling communication to a hardware platform 412, and facilitating communication between numerous computer systems that include a CPU and a storage system, among other computer components.

Computer-aided modeling software (e.g., process 300) may be stored on the storage device 410 and loaded into and executed by the CPU 402. The modeling software allows a design engineer to create and modify a 3D model and implements aspects of the invention described herein. The CPU 402 uses the computer monitor 404 to display a 3D model and other aspects thereof as described. Using the keyboard 406 and the mouse 408, the design engineer can enter and modify data associated with the 3D model. The CPU 402 accepts and processes input from the keyboard 406 and mouse 408. The CPU 402 processes the input along with the data associated with the 3D model and makes corresponding and appropriate changes to that which is displayed on the computer monitor 404 as commanded by the modeling software. In one embodiment, the modeling software is based on a solid modeling system that may be used to construct a 3D model consisting of one or more solid and surface bodies.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Embodiments of the present invention or aspects thereof described herein may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of computer systems, environments, and/or configurations that may be suitable for use with aspects of the invention include, but are not limited to, personal computers (PCs), server computers, hand-held and laptop devices, multiprocessor systems, microprocessor-based systems, set top boxes, programmable consumer electronics, mobile telephones and mobile operating systems, network PCs, minicomputers, mainframe computers, distributed computing environments that include any of the above systems or devices, and the like. The computer system may have standalone components or workstations, or the computer system may be formed of networked computers by any of known communications networks, processing networks, cloud-based networks, related protocols and the like.

As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network is merely exemplary and in no way limits the scope of the present advancements.

The present invention provides numerous advantages that aid the user in designing an appropriately constrained 3D model and real-world mechanism represented by the 3D model. These advantages include solving a complex problem that is very difficult to solve manually, tightly integrating in the computer-aided design workflow a process for solving constraints, and continuously solving for constraints during the design workflow process so that a user may continuously visualize the final design and iterations thereof with all unknown design parameters solved. Moreover, the present invention provides a solution that results in an accurate design of multiple positions of a mechanism and does so significantly faster than prior art.

Other advantages include allowing the user to design a mechanism in multiple positions at once while simultaneously solving for the constraints of the multiple positions, allowing the user to define multiple unknown dimensions in different positions of the CAD model while all the unknowns are solved for together, always keeping the designs in different positions up-to-date with all the unknowns solved for, and enabling the user to interactively drag or change the mechanism in any position and having the results updated continuously.

Further advantages include the computation of the values of the design parameters so that the design targets are met with minimal design iterations, allowing a user to define multiple design studies with different sets of parameters (e.g., what-if scenarios), and moving the constraint solving capability up into the design iteration loop.

Moreover, the embodiments disclosed herein offer additional significant advantages over present technology, including providing an extremely easy and quick way to define positions and solve the constraints necessitated by those positions, an efficient way to do what-if analyses, and instant visual feedback that allows users to modify the design quickly.

While the present invention has been particularly shown and described with references to example embodiments thereof, those skilled in the art will understand that various changes in form and details may be made therein without departing from the invention encompassed by the appended claims. Furthermore, implementations may change the order in which operations are performed. Moreover, depending on the needs of an implementation, particular operations described herein may be implemented as a combined, eliminated, added to, or otherwise rearranged. As a non-limited example, in FIG. 3, step 310 need not follow step 340, but rather step 320 may be executed after step 340.

What is claimed is:

1. A computer-implemented method for automatically solving constraints in a computer-aided design (CAD) model, the method comprising:
    in a CAD design workflow, responsive to user interaction, constructing a CAD model of a real-world object, the CAD model being formed of model components and being capable of assuming multiple positions along a path representative of positions of the real-world object, the constructing being performed by one or more processors;
    initiating, by one of the processors, a constraint solver process that executes as a background process while the multiple positions, including a base position and one or more additional positions, of the CAD model along the path are being defined by a user in the CAD design workflow viewing one position at a time, and in the constraint solver process, design parameters that are unknown variables are solved for the multiple positions of the CAD model;
    defining interactively by the user the base position of the CAD model in the CAD design workflow, including defining for the base position a set of dimensions of model component features and a set of constraints between model components;
    in the background process by one of the processors, automatically inputting from the CAD design workflow to the constraint solver process the user-defined set of dimensions and the user-defined set of constraints;
    defining interactively by the user the one or more additional positions of the CAD model along the path in the CAD design workflow, including defining for each additional position a respective set of dimensions of model component features and a respective set of constraints between model components;

in the background process by one of the processors, automatically inputting from the CAD design workflow to the constraint solver process the respective user-defined set of dimensions for each additional position and the respective user-defined set of constraints for each additional position;

during the CAD design workflow, solving for one or more of the unknown variables in the multiple positions of the CAD model, said solving being performed by the constraint solver process, wherein the solving satisfies user-defined constraints of each of the user-interactively defined base position and the user-interactively defined one or more additional positions, the CAD design workflow displaying each of the base position and the one or more additional positions of the CAD model in separate views; and as the unknown variables are being solved, updating the CAD model, including adjusting geometry of model components, on a computer screen to provide visual feedback of a design iteration.

2. The computer-implemented method of claim 1, further comprising:

applying for each additional position the respective user-defined set of constraints and the respective user-defined set of dimensions specific to each additional position; and adding equality constraints between variable dimensions in at least one additional position and the base position.

3. The computer-implemented method of claim 1, wherein the constraint solver process is tightly integrated in the CAD design workflow as part of a design iteration loop.

4. The computer-implemented method of claim 1, further comprising:

during the CAD design workflow, continuously solving for the respective user-defined set of dimensions and the respective user-defined set of constraints for each additional position.

5. The computer-implemented method of claim 1, wherein the constraint solver process adjusts geometry of the CAD model to solve for a unique position.

6. The computer-implemented method of claim 1, further comprising:

redefining one of the additional positions; and solving by the constraint solver process at least one of new and updated data generated as a result of redefining one of the additional positions.

7. The computer-implemented method of claim 1, wherein the CAD model is one of a two-dimensional model and a three-dimensional model.

8. A computer-aided design system comprising:

one or more processors operatively coupled to a data storage system, the data storage system storing a model; and a data storage memory operatively coupled to the one or more processors and comprising instructions to configure the one or more processors to:

in a CAD design workflow, responsive to user interaction, construct a computer-aided design (CAD) model of a real-world object, the CAD model being formed of model components and being capable of assuming multiple positions along a path representative of positions of the real-world object;

initiate, by one of the processors, a constraint solver process that executes as a background process while a user defines the multiple positions, including a base position and one or more additional positions, of the CAD model along the path in the CAD design workflow viewing one position at a time, and in the constraint solver process, design parameters that are unknown variables are solved for the multiple positions of the CAD model;

receive for the base position of the CAD model a user-defined set of dimensions of model component features and a user-defined set of constraints between model components, the base position being defined interactively by the user in the CAD design workflow;

in the background process, automatically input from the CAD design workflow to the constraint solver process the user-defined set of constraints and the user-defined set of dimensions;

receive for each of the one or more additional positions of the CAD model along the path, a respective user-defined set of dimensions of model component features and a respective user-defined set of constraints between model components, the one or more additional positions being defined interactively by the user in the CAD design workflow;

in the background process, automatically input from the CAD design workflow to the constraint solver process the respective user-defined set of dimensions for each additional position and the respective user-defined set of constraints for each additional position;

during the CAD design workflow, solve for one or more of the unknown variables in the multiple positions of the CAD model, said solving being performed by the constraint solver process in the background process, wherein the solving satisfies user-defined constraints of each of the user-interactively defined base position and the user-interactively defined one or more additional positions, the CAD design workflow displaying each of the base position and the one or more additional positions of the CAD model in separate views; and as the unknown variables are being solved, update the CAD model, including adjusting geometry of model components, on a computer screen to provide visual feedback of a design iteration.

9. The computer-aided design system of claim 8, further comprising instructions to configure the processor to:

for each additional position, apply the respective user-defined set of constraints and the respective user-defined set of dimensions specific to each additional position; and add equality constraints between variable dimensions in at least one additional position and the base position.

10. The computer-aided design system of claim 8, wherein the constraint solver process is tightly integrated in the CAD design workflow as part of a design iteration loop.

11. The computer-aided design system of claim 8, further comprising instructions to configure the processor to:

continuously solve for the respective user-defined set of dimensions and the respective user-defined set of constraints for each additional position during the CAD design workflow.

12. The computer-aided design system of claim 8, wherein the constraint solver process adjusts geometry of the CAD model to solve for a unique position.

13. The computer-aided design system of claim 8, further comprising instructions to configure the processor to:

redefine one of the additional positions; and solve by the constraint solver process at least one of new and updated data generated as a result of redefining one of the additional positions.

14. The computer-aided design system of claim 8, wherein the CAD model is one of a two-dimensional model and a three-dimensional model.

15. A non-transitory computer-readable data storage medium comprising instructions causing a computer to:
 in a CAD design workflow, responsive to user interaction, construct a computer-aided design (CAD) model of a real-world object, the CAD model being formed of model components and being capable of assuming multiple positions along a path representative of positions of the real-world object, the constructing being performed by one or more processors;
 initiate, by one of the processors, a constraint solver process that executes as a background process while a user defines the multiple positions, including a base position and one or more additional positions, of the CAD model along the path in the CAD design workflow viewing one position at a time, and in the constraint solver process, design parameters that are unknown variables are solved for the multiple positions of the CAD model;
 define interactively by the user the base position of the CAD model in the CAD design workflow, including defining a set of dimensions of model component features and a set of constraints between model components;
 in the background process, automatically input from the CAD design workflow to the constraint solver process the user-defined set of dimensions and the user-defined set of constraints;
 define interactively by the user the one or more additional positions of the CAD model along the path in the CAD design workflow, including defining for each additional position a respective set of dimensions of model component features and a respective set of constraints between model components;
 in the background process, automatically input from the CAD design workflow to the constraint solver process the respective user-defined set of dimensions for each additional position and the respective user-defined set of constraints for each additional position;
 during the CAD design workflow, solve for one or more of the unknown variables in the multiple positions of the CAD model, said solving being performed by the constraint solver process in the background process, wherein the solving satisfies user-defined constraints of each of the user-interactively defined base position and the user-interactively defined one or more additional positions, the CAD design workflow displaying each of the base position and the one or more additional positions of the CAD model in separate views; and
 as the unknown variables are being solved, update the CAD model, including adjusting geometry of model components, on a computer screen to provide visual feedback of a design iteration.

16. The computer-readable data storage medium of claim 15, further comprising instructions causing a computer to:
 for each additional position, apply the respective user-defined set of constraints and the respective user-defined set of dimensions specific to each additional position; and
 add equality constraints between variable dimensions in at least one additional position and the base position.

17. The computer-readable data storage medium of claim 15, wherein the constraint solver process is tightly integrated in the CAD design workflow as part of a design iteration loop.

18. The computer-readable data storage medium of claim 15, further comprising instructions causing a computer to:
 continuously solve for the respective user-defined set of dimensions and the respective user-defined set of constraints for each additional position during the CAD design workflow.

19. The computer-readable data storage medium of claim 15, wherein the constraint solver process adjusts geometry of the CAD model to solve for a unique position.

20. The computer-readable data storage medium of claim 15, further comprising instructions causing a computer to:
 redefine one of the additional positions; and
 solve by the constraint solver process at least one of new and updated data generated as a result of redefining one of the additional positions.

\* \* \* \* \*